(12) United States Patent
Texeraud

(10) Patent No.: US 10,897,997 B2
(45) Date of Patent: Jan. 26, 2021

(54) ARMCHAIR COMPRISING AN ADJUSTABLE HEADREST

(71) Applicant: STELIA AEROSPACE, Rochefort (FR)

(72) Inventor: Laurent Texeraud, Clavette (FR)

(73) Assignee: STELIA AEROSPACE, Rochefort (FR)

(*) Notice: Subject to any disclaimer, the term of this patent is extended or adjusted under 35 U.S.C. 154(b) by 0 days.

(21) Appl. No.: 16/473,468

(22) PCT Filed: Dec. 27, 2017

(86) PCT No.: PCT/FR2017/053856
§ 371 (c)(1),
(2) Date: Jun. 25, 2019

(87) PCT Pub. No.: WO2018/122536
PCT Pub. Date: Jul. 5, 2018

(65) Prior Publication Data
US 2020/0196765 A1  Jun. 25, 2020

(30) Foreign Application Priority Data

Dec. 27, 2016 (FR) ..................... 16 63413

(51) Int. Cl.
*A47C 7/38* (2006.01)
*B64D 11/06* (2006.01)
(Continued)

(52) U.S. Cl.
CPC .................. *A47C 7/38* (2013.01); *B60N 2/34* (2013.01); *B60N 2/838* (2018.02); *B60N 2/862* (2018.02);
(Continued)

(58) Field of Classification Search
CPC . A47C 7/38; B60N 2/34; B60N 2/838; B60N 2/865; B60N 2/862; B60N 2/64; B64D 11/0642; B64D 11/0641
See application file for complete search history.

(56) References Cited

U.S. PATENT DOCUMENTS 2,307,621 A * 1/1943 Dorton .................. A47C 1/026
                                                    297/367 R
2,466,553 A * 4/1949 McDonald, Jr. ....... B60N 2/832
                                                    297/404
(Continued)

FOREIGN PATENT DOCUMENTS

| DE | 101 31 862 | 2/2003 |
| EP | 0 976 608 | 2/2000 |
| FR | 2 129 447 | 10/1972 |

OTHER PUBLICATIONS

International Search Report, PCT/FR2017/053856, dated Apr. 11, 2018.

*Primary Examiner* — Milton Nelson, Jr.
(74) *Attorney, Agent, or Firm* — Nixon & Vanderhye

(57) ABSTRACT

A seat including a seat portion, a backrest, and a headrest attached to a structure of the backrest. The headrest includes a head cushion attached to the backrest by at least one headrest arm; the arm is hingedly attached to the backrest structure by a pivot link with a transverse axis; the head cushion is hinged to the arm by a pivot link with a transverse axis. Moreover, the first axis is situated at a rear face of a structural part of the backrest; the second axis is situated close to the bottom edge of the head cushion; in the lowered position, the arm holds the head cushion bearing against the front face of the backrest; in the raised position, the arm holds the head cushion above and in front of the lowered position.

19 Claims, 3 Drawing Sheets

(51) Int. Cl.
*B60N 2/838* (2018.01)
*B60N 2/862* (2018.01)
*B60N 2/34* (2006.01)

(52) U.S. Cl.
CPC ...... *B64D 11/0641* (2014.12); *B64D 11/0642* (2014.12)

(56) References Cited

U.S. PATENT DOCUMENTS

| | | | | |
|---|---|---|---|---|
| 3,275,374 A * | 9/1966 | Holzner | ............... | A47C 1/036 297/403 |
| 3,507,538 A * | 4/1970 | Stoller | ............... | A47C 7/38 297/410 |
| 3,784,253 A | 1/1974 | Kohler et al. | | |
| 3,885,831 A | 5/1975 | Rasmussen | | |
| 4,376,552 A * | 3/1983 | Pilhall | ............... | B60N 2/3013 297/391 |
| 6,663,181 B2 * | 12/2003 | Nygren | ............... | B60N 2/3013 297/408 |
| 7,070,240 B2 * | 7/2006 | Schmitt | ............... | B60N 2/3013 297/410 |
| 7,500,721 B2 * | 3/2009 | Beroth | ............... | B60N 2/821 297/410 |
| 2014/0159436 A1 * | 6/2014 | Iacobucci | ............... | B60N 2/995 297/75 |

* cited by examiner

ARMCHAIR COMPRISING AN ADJUSTABLE HEADREST

FIELD OF THE INVENTION

The invention belongs to the field of resting seats, such as seats used in the layout of passenger spaces of vehicles and more particularly aircraft.

The invention relates, in particular to a seat comprising a headrest used to provide a support of the head of the seat occupant in order to improve comfort.

More particularly, in the invention the headrest is adjustably attached to the backrest of the seat.

PRIOR ART

In the field of passenger transport, in particular aircraft, seats offered to the passengers represent equipment having a strong commercial impact.

The airlines which operate the aircraft are therefore demanding in terms of the comfort offered to passengers, but also remain attentive to costs of the equipment in terms of both acquisition and maintenance thereof.

Headrests, sometimes designated head supports, are one of the elements of a seat which contribute to the comfort of the passenger by offering the possibility of relaxing positions with good support of the head.

In order to be effective, a headrest must however be adjustable in order to adapt to the morphology of a passenger and, if necessary, to adapt to different positions of the passenger occupying the seat.

Thus seats are known for which the headrest, comprising a cushion intended to receive the head of the seat occupant, is mounted on rails in the extension of the backrest, so that the height of the cushion can be adjusted to adapt to the size of the seat occupant and, in certain cases, providing options for forward or backward movement of the cushion.

The headrest, when positioned in the low position on the backrest, adapted to the morphology of a short seated passenger, can be located as a continuation of the backrest and above this when the backrest is straightened, as for example in U.S. Pat. No. 3,885,831 in which the headrest is supported by an arm consisting of a plurality of segments hinged together, one of which is mounted so as to slide in the vertical direction on the backrest.

In a form generally considered more aesthetic and more integrated with the seat, the cushion can be located in a space produced in the padding of the backrest, as in the embodiment described in U.S. Pat. No. 2,466,553, in order to ensure a continuity of the front face of the backrest in this low configuration of the headrest. In this case, the cushion is also mounted on an arm consisting of a plurality of segments hinged together and one of which is mounted so as to slide and tilt on the backrest.

However, these configurations of the headrest have the disadvantage of having complex kinematics for providing particular adjustments of the headrest, and their impact on the structure and on the cushions of the backrest of the seat, on the footprint and the mass of the seat are unsatisfactory, in particular in the aeronautics field.

From patent application EP 0976608 A1, a headrest is also known for which the cushion is attached to the backrest by an assembly of rods which allow the cushion to be located in a low position on the backrest and to simultaneously raise and advance this cushion into a position of use. However, in this solution, the cushion provides a continuity of the backrest, the shapes of which are significantly impacted by the presence of the headrest, which is disadvantageous for the seat when the headrest is removed from it, and the height of the backrest is moreover subject to functional constraints.

There is therefore an interest, in the case of technically and economically constrained uses such as the aircraft seats, in implementing relatively simple solutions, with guaranteed reliability, that are lightweight and which are not penalising for the footprint and the mass of a seat.

PRESENTATION OF THE INVENTION

The present invention provides a solution to the stated drawbacks of the known solutions, by means of a seat comprising a headrest attached to the backrest of the seat.

The seat comprises a seat portion and a backrest, the backrest including a padding, and comprises a headrest attached to a structure of the backrest.

The headrest comprises a head cushion attached to the backrest by at least one headrest arm that is rigid and of predefined elasticity, and such that:

said at least one headrest is hingedly attached on the structure of the backrest by a pivot link determining a first axis of rotation, parallel to a transverse direction Y of the seat, fixed with respect to the structure of said backrest;

said head cushion is hinged on the at least one headrest arm by a pivot link determining a second axis of rotation, parallel to the transverse direction Y of the seat, fixed with respect to the head cushion.

In addition:

the first axis is situated in a top part of the backrest and substantially at a rear face of a structural part of said backrest;

the second axis is situated close to a lower edge of the head cushion, and;

the headrest arm 16 is arranged so as to hold the head cushion resting against a front face of the backrest in a low position of said headrest, and for holding said head cushion in front of and above its position in the low position of the headrest, in at least one raised position of said headrest;

the head cushion being moved between the low position and the at least one raised position of the headrest by a rotation of the at least one headrest arm about the first axis, said at least one arm being shaped to go around the backrest, without interfering with the padding of the backrest, in all the positions of the headrest arm between the low position and the at least one raised position of the head cushion.

A seat is thus obtained, for which the comfort is improved by a headrest held by a rigid arm and the position of which can be adjusted in a simple manner, vertically, longitudinally and in terms of tilt, by rotary movements about two pivot connections with parallel axes. According to this arrangement, the headrest can be attached to the seat as an option having no consequence for the rest of the definition of the seat, both in terms of its structure as well as its padding and its trim, the mechanical complexity is reduced which is beneficial for the mass of the seat, equipped or otherwise with the headrest, for the reliability and costs of both acquisition and maintenance.

In an embodiment of the seat, the at least one headrest arm has, in profile view, an L shape determining a first segment, a free end of which is hinged on the structure of the backrest about the first axis, determining a second segment, at a free end of which the head cushion is hinged about the second axis, and when the headrest is in the low position, the second segment is substantially against the front face of the backrest and the first segment is above the backrest.

In this configuration, the shapes of the backrest, and in particular the shapes of the padding on the front face of the backrest are not affected by the presence of the headrest, whatever its position, which makes it possible to implement only one shape of padding, that the seat comprises or otherwise the headrest and which makes it possible to achieve the conversion of the configuration of the seat with or without headrest, without any major modification on the seat other than the installation or removal of the headrest.

In an embodiment, when the headrest is in the low position, the first segment is substantially against an upper face of the backrest. Thus, the mechanical and visual impact of the one or more headrest arms is minimised.

In an embodiment, a support of the head cushion, situated on a rear face of said head cushion, comprises at least one recess, on a rear face of said support located facing the front face of the backrest, in which the second segment of the at least one headrest arm is housed when the headrest is in the low position.

Thus, the headrest in the low position is close to the padding of the backrest without the support risking pressing on the padding and marking or deforming it.

In order to stabilise the position of the headrest and to limit the risks of undesired movements in the use, a brake and/or a lock is arranged on the first axis in order to hold a selected angular position of the at least one headrest arm with respect to the backrest and, if needed, a brake and a lock is arranged on the second axis in order to hold a selected angular position of the head cushion with respect to the at least one headrest arm.

In an embodiment, the pivot link determining the first axis is arranged in an enclosing space of the backrest, and a trim of the backrest comprises an opening via which the at least one headrest arm hinged about the first axis exits said enclosing space. Thus, whether the headrest is present or not, the first axis is invisible and protected by the trim of the backrest and, when the headrest is removed, the opening can be closed by a simple cover or with a modified trim.

In an embodiment, the headrest comprises a single headrest arm having a blade shape for which an average width in the transverse direction Y of the seat is several times greater than average thickness of said blade.

In another embodiment, the head cushion is attached to the structure of the backrest by a plurality of headrest arms, all the headrest arms of said plurality of headrest arms being hinged on the structure of the backrest about a same first axis, and the head cushion being hinged on each of the headrest arms of said plurality of headrest arms about a same second axis.

In this case, each headrest arm of the plurality of headrest arms, or certain of these, has, as appropriate, a blade shape for which an average width in the transverse direction Y of the seat is several times greater than average thickness of said blade.

In an embodiment, the blade or blades of the headrest arm or arms are produced having predefined elasticities.

In an embodiment of a seat that is convertible into a bed by a tilting the backrest backwards, the headrest has a position for holding the head of a seat occupant raised in the bed position, position in which the at least one headrest arm is pivoted backwards, when the backrest is in a position tilted backwards about the first axis and wherein the head cushion is pivoted forwards about the second axis. The seat occupant is therefore provided with a raised position supporting the head, suitable for reading or watching a video screen, and which complements the low position of the headrest suitable for serving as a pillow in periods when the occupant is sleeping.

In an embodiment of the seat, in the low position of the headrest, the position of the head cushion with respect to the backrest is defined to correspond to an ergonomic supporting of the head in the seated position of an occupant belonging to small-sized population at the 5th percentile of a predefined sample of a target adult population, and wherein, in a raised position of the headrest, said head cushion is moved upwards and forwards with respect to the low position into a position of said head cushion with respect to the backrest, defined so as to correspond with an ergonomic supporting of the head in the seated position of an occupant belonging to a large-sized population at 95th percentile of said sample of the target adult population.

In this way, a seat is produced which is able to be converted, with or without headrest, without sacrificing, when the headrest is used, the comfort requirements of a majority of an adult population known to be that which must use the seats.

The seat according to one of the preceding claims, wherein the backrest padding 11 is shaped to be used on a seat with or without headrest.

DESCRIPTION OF THE FIGURES

The invention is described with reference to the figures, which are provided by way of a non-limiting example of an embodiment of the invention. The figures schematically represent.

The drawings are not necessarily illustrated with the same scale in the various figures.

DETAILED DESCRIPTION OF AN EMBODIMENT OF THE INVENTION

Figure 1:
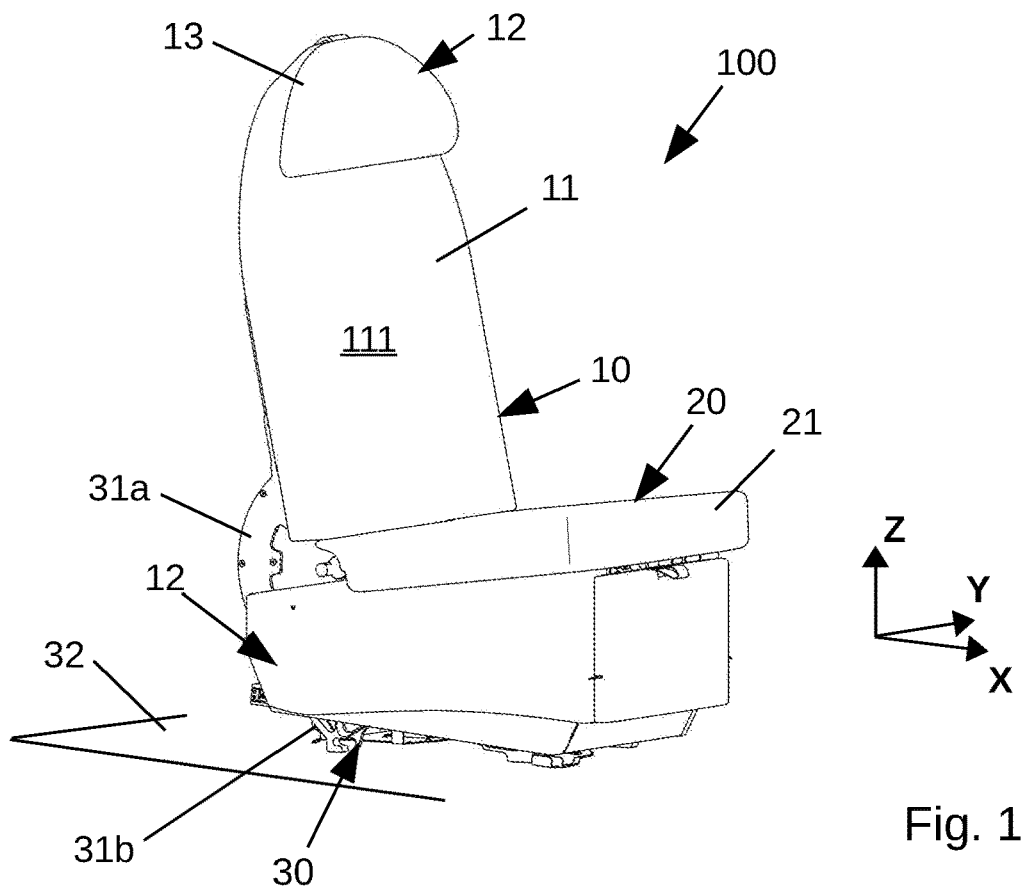
FIG. 1, a perspective view of a seat, viewed from the front of the seat, without accessories, according to the invention, with the headrest in the low position applied on the front face of the backrest.

FIG. 1 shows an example of a seat 100 according to the invention.

For the purposes of the description, reference will be made to a conventional system of axes with a horizontal axis X positively oriented towards the front of the seat, a vertical axis Z positively orientated upwards and a lateral axis Y, perpendicular to a plane defined by the horizontal and vertical directions and positively orientated towards the left.

The terms front, rear, top, bottom and equivalent terms or expressions refer to positions or directions which would be given by a user of the seat when seated in said seat. Thus, the front of the seat corresponds to the direction in which the occupant seated in the seat is looking, without turning the head, independently of the orientation that the seat may have with respect to the direction of movement of a vehicle in which it is installed.

The seat 100 has a conventional seat architecture and comprises a seat portion 20 and a backrest 10, represented schematically in FIG. 1. The seat here is simplified and stripped of other accessories, for example armrests or a leg rest, which may or may not be present on a seat of the invention.

The seat 100 also comprises a support structure 30 which gives the seat the rigidity required for supporting the weight of an occupant under all envisaged conditions of use of the seat, which enables the seat to be attached to another structure which must bear it, for example a vehicle floor 32.

When the seat 100 comprises parts which can move with respect to one another, as is frequently the case when the seat has several positions which require relative movements of the seat portion 20 and the backrest 10, for example when the seat can be converted into a recliner by pivoting backwards of the backrest, the bearing structure 30 comprises parts 31a, 31b which can move with respect to one another, and systems for locking the movements. These means can take various forms and are well known to a person skilled in the art. They will not be described further here.

In addition, the bearing structure 30 of the seat is generally covered with trim for comfort, including a padding of the seat portion 21 and a backrest padding 11.

The bearing structure 30 also comprises trim which protects or conceals, for technical and/or aesthetic reasons, parts of said bearing structure, and defines together with the paddings the external shape of the seat.

The seat 100 of the invention also comprises a headrest 12.

The headrest 12 is attached to the backrest in a top part of the backrest 10, which should be understood here as the part corresponding to an upper part of said backrest when the seat is attached to the floor 32 and the backrest is upright in order to provide a seated position to the seat occupant.

In addition, a head cushion 13 of the headrest 12 is removably attached on the backrest 10 by a hinge system comprising two mutually offset axes.

Figure 2C:
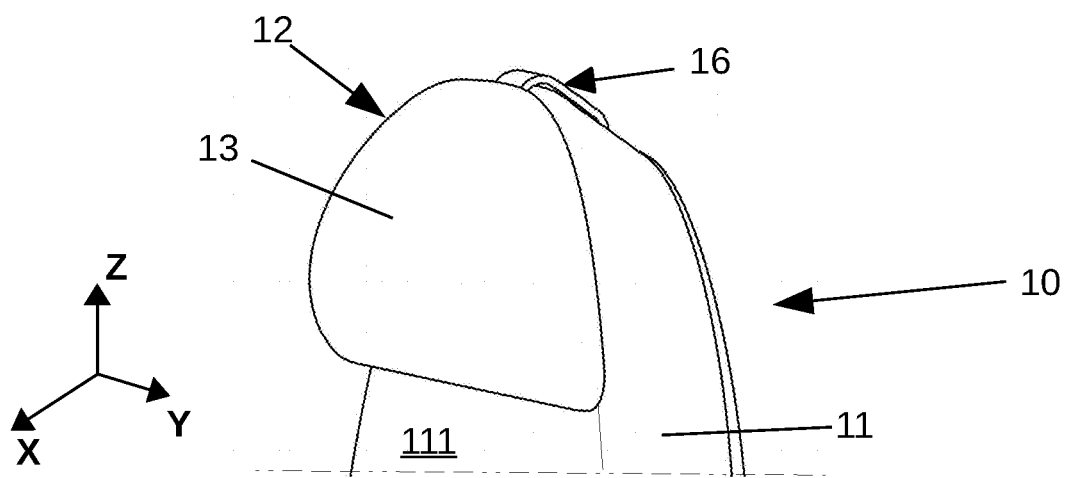
FIGS. 2*a*, 2*b* and 2*c*, partial views of the seat of FIG. 1 showing the top of the backrest comprising the headrest in the low position, viewed in profile in FIG. 2*a*, in perspective view from the rear in FIG. 2*b* and in perspective view from the front in FIG. 2*c*.
Figure 2B:
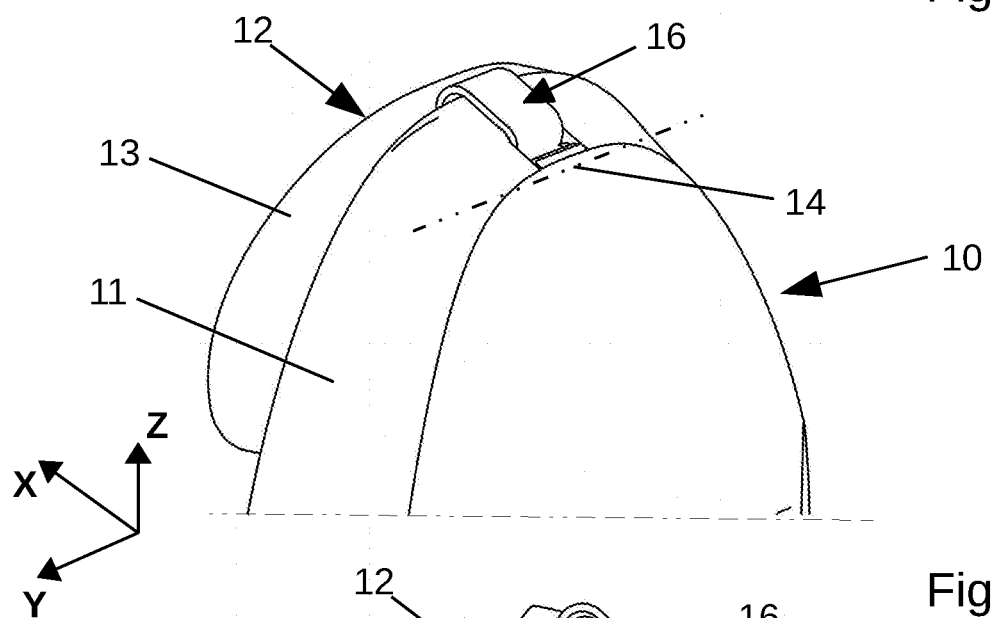
Figure 2A:
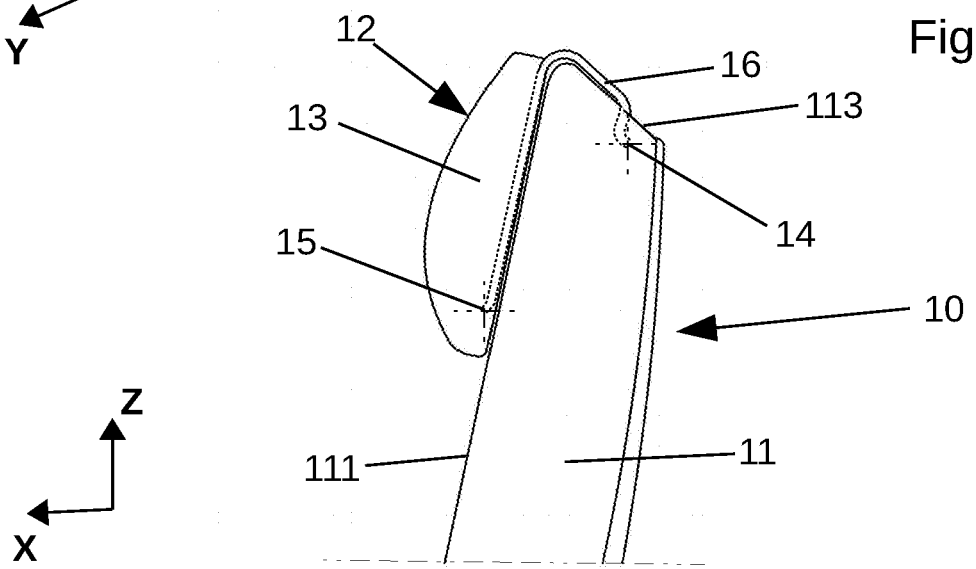

With reference to FIG. 2a, a pivot link determines a first axis 14 parallel to the transverse axis Y of the seat, fixed with respect to the structure of the backrest 10.

Another pivot link determines a second axis 15 parallel to the transverse axis Y of the seat, and thus parallel to the first axis 14, fixed with respect to a support 17 of the head cushion.

A headrest arm 16 provides a mechanical link between the structure of the backrest 10 and the support 17 of the head cushion.

The headrest arm 16 is hinged, at a first end 161 of said headrest arm, on the structure of the backrest 10 about the first axis 14.

The headrest arm 16 is hinged, at a second end 162 of said headrest arm, on the support 17 of the head cushion, about the second axis 15.

In addition, in the illustrated embodiment, the headrest arm 16 is a rigid-shaped arm determining a desired length between the first axis 14 and the second axis 15, apart from a possible elastic deformation permitted for said headrest arm.

The rigidity considered here is such as to be suitable for qualifying an arm not comprising a plurality of elements hinged to one another. It is however relative in that it is sufficient to hold the head cushion 13 in a stable position with respect to the backrest, even if, in practice, the arms can have a perceptible elasticity for the seat occupant when resting his head on said head cushion, and in this case the head cushion will be returned to the stable position when it is no longer subject to a pressing force. In an embodiment, a predefined elasticity of the headrest arm is sought in order to give the seat occupant an impression of flexibility when he rests on the headrest. In this case, a stiffness or chosen elasticity is sufficiently large so that the deformation of the arm is limited, under the forces envisaged during use of the seat, in order to avoid interfering with a protected volume of the seat.

Figure 3C:
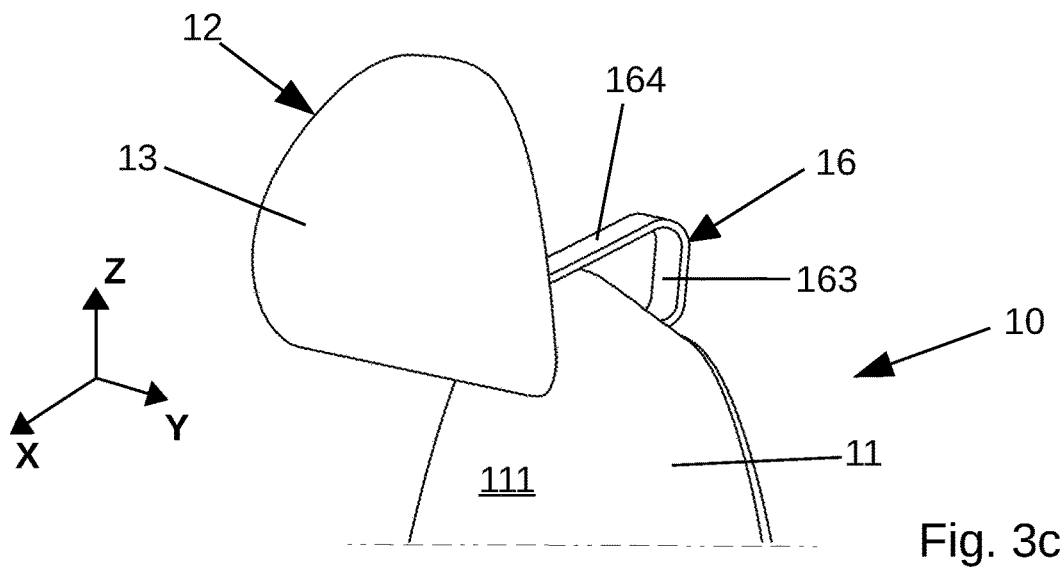
FIGS. 3*a*, 3*b* and 3*c*, partial views of the seat of FIG. 1 showing the top of the backrest comprising the headrest in the raised position, viewed in profile in FIG. 3*a*, in perspective view from the rear in FIG. 3*b* and in perspective view from the front in FIG. 3*c*.
Figure 3B:
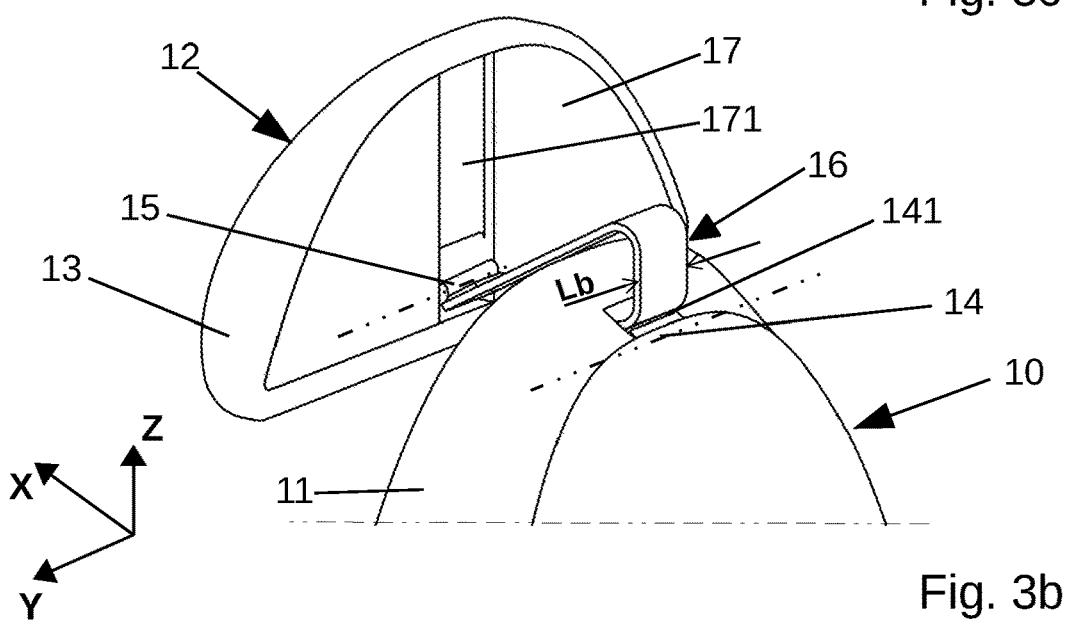
Figure 3A:
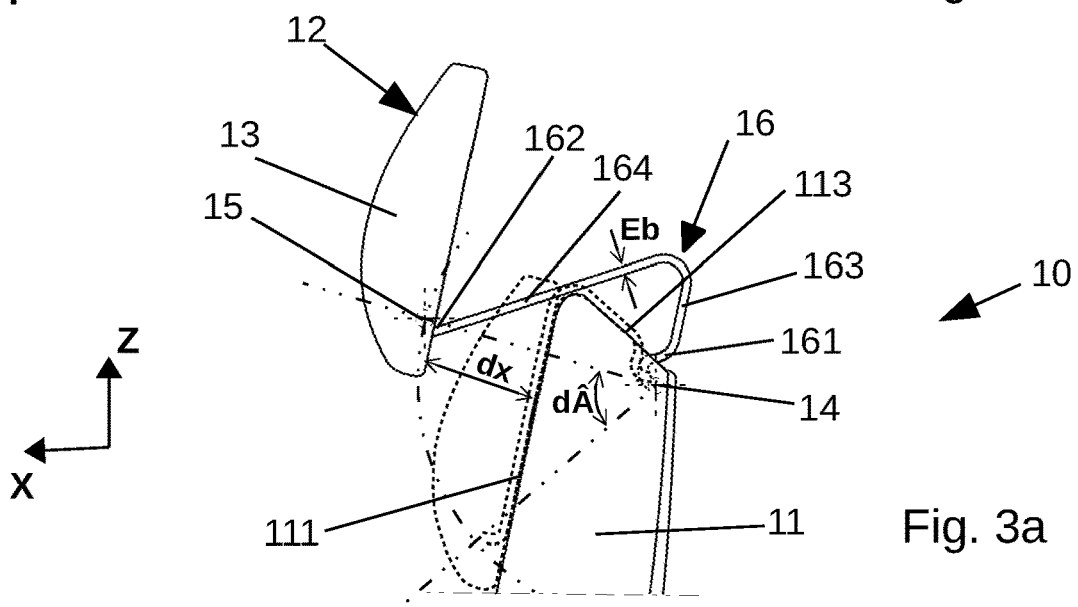

The second axis 15 thus describes, with respect to the backrest, a path following a circular arc centred on the first axis 14 when the headrest arm 16 pivots with respect to the backrest about said first axis, driving the support 17 and the head cushion 13 along this circular path, illustrated in FIG. 3a.

In a low position of the headrest 12, as illustrated in FIGS. 2a, 2b and 2c, the head cushion 13 is located against the backrest padding 11 in an upper part of the backrest 10, advantageously so that an upper edge of said head cushion is substantially in the extension of an upper face 113 of the backrest. In this low position, the second axis 15 is also close to said backrest padding, with the head cushion being in the closest possible position to said backrest, in other words a rear face of the head cushion or of its support substantially resting on a front face 111 of the backrest padding. This low position of the headrest is suitable for an occupant of relatively small size in a seated position in the seat 100.

In a raised position of the headrest 12, as illustrated in FIGS. 3a, 3b and 3c, the headrest arm 16 is pivoted upwards about the first axis 14 such that the second axis 15, and therefore the head cushion 13, is in a raised position with respect to the low position. In this position, a rotation of the support 17 of the head cushion 13 about the second axis 162 enables the occupant of the seat to modify or adjust an angle of the headrest with respect to the backrest 10. In the illustrated example, as can be seen in FIG. 3a, the headrest is represented with a same tilt as the backrest which is also the tilt of the headrest when said headrest in the low position is resting on said backrest; see FIG. 2a.

Following the movement described by the headrest between the low position and the raised position, provided that the position of the second axis 15 is not arranged in the vertical direction Z significantly above the first axis 14, it is found that the headrest in the raised position also has a position in the longitudinal direction X that is advanced with respect to that which it has in the low position.

To a first approximation, the headrest is advanced between the two positions by a distance dx corresponding to a radius R between the first axis and the second axis, reduced by the distance between said first axis and the front face 111 of the backrest padding 11, under an assumption in which a line determined in profile view by the first axis and the second axis is substantially perpendicular to said front face of the backrest padding, as illustrated in FIG. 3a.

This forward movement of the headrest during the passage into the raised position improves the ergonomics of the seat, in that the low position of the headrest is suitable for a seat occupant of small size having a natural posture corresponding to a head support that is further back than for a large-size occupant who will be better supported in the high position of the headrest not only through the vertical positioning better suited to his size, but also through the advanced position of the headrest that is better adapted to the support of his head.

In an embodiment, the distance dx, which enables the radius R to be defined between the first axis and second axis depending on the other size characteristics of the backrest, is selected to be between 0.04 and 0.06 m, advantageously substantially equal to 0.05 m. In this example, the resulting radius R is between 0.120 m and 0.125 m.

In the exemplary embodiment illustrated in the figures, the headrest arm 16 is also shaped so as not to interfere with the backrest 10, which it goes around by passing over said backrest, and more particularly with the padding 11 of said backrest. For this purpose, the headrest arm 16 has a profile with an L-shaped assembly in order to produce an offset of said headrest arm with respect to a plane defined by the first axis 161 and the second axis 162.

The arm 16 is thus rotatably attached on the backrest 10 on the side of the first end 161 corresponding to an end of a first segment 163 of the L shape so that, when the headrest 12 is in the low position, said first segment is located above the backrest, advantageously substantially resting on the upper face 113 of the backrest, and so that a second segment 164 of the L shape is located substantially against the front face 111 of the backrest padding 11, as illustrated in the views of FIGS. 2a, 2b and 2c.

The first segment 163 and the second segment 164 thus determine, in this configuration, an angle substantially equal to an angle formed by the front face 111 of the backrest padding and the upper face 113 of the backrest.

It is understood here that the arm 16, excluding its pivot link with the backrest about the axis 161, does not interfere with the backrest since it goes around said backrest via the top, a by-passing which enables pivoting of said arm upwards, while always avoiding interference with the backrest, as illustrated in the views of FIGS. 3a, 3b and 3c, and not requiring use of a padding or trim of said backrest with shapes adapted to the presence of the headrest.

It should also be noted that the amplitude of the vertical movement of the head cushion depends directly on the radius R between the first axis 161 and second axis 162 and on an angle of rotation dÂ about the first axis defined for the headrest arm 16. In accordance with the illustrations, it is therefore advantageous to locate the second axis 162 on the support 17 as low as possible, or at least sufficiently low with respect to the first axis 161, in the low position of the headrest, in order to obtain the desired amplitude of the vertical movement of the head cushion 13 with an angle of rotation dÂ that is limited in practice.

It should also be noted that the larger the radius R between the first axis 161 and the second axis 162, the smaller will be the amplitude of the forward movement of the head cushion 13 with respect to the backrest 10, changing substantially as R multiplied by the term "1 minus the sine of the angle of rotation of the arm about the first axis", for an amplitude, changing substantially as R multiplied by "minus the absolute value of the cosine of the angle of the arm about the first axis", given the desired vertical movement. In order to avoid an excessive amplitude of this forward movement and to keep this movement within the ergonomic criteria disclosed above, it is therefore chosen to move back, to a greater or lesser degree, the first axis 14 on the backrest, said first axis which will for example be located close to a rear face of the backrest 10, and remote from the front face 111 of the backrest padding, within the limits imposed by the structure needing to take up the forces undergone by said first axis.

In an embodiment, an amplitude of the angle of rotation dÂ of the arm 16 is between 40° and 70°, advantageously substantially 60°, which makes it possible, under the conditions of the embodiment discussed above, to obtain an amplitude of the vertical movement of 0.112 m.

In an embodiment, as illustrated, the support 17 of the head cushion comprises a rear recess 171, visible in FIG. 3b, the dimensions of which are sufficient so that the second segment 164 is located flush-mounted there when the headrest is in the low position resting on the backrest padding, such that said support is realised on the maximum surface of the support 17 and avoids a marking of said backrest padding by the arm 16.

In an improved embodiment, as illustrated in the figures, the first end 161 of the arm, corresponding to a free end of the first segment 163, comprises a curved portion so that the first axis 14 is located inside the backrest 10 while holding the first segment 163 above the upper face of the backrest for all the considered positions of the headrest arm 16. Such a curved shape is visible in the FIG. 4 which shows a section of the backrest in the region of the headrest. A hinge is thus avoided outside of the backrest which, in addition to an unaesthetic appearance, could constitute a protrusion from the seat on which an occupant could injure themselves.

A suitable curve, in other words one substantially following a circular arc centred on the first axis 14, of said curved portion also limits the dimensions of an opening of the backrest trim, through which said headrest arm passes, to the cross-section of said headrest arm.

Moreover, in this configuration, the structural part of the backrest can be identical for seats comprising and seats not comprising a headrest, an opening 141 of the backrest through which the headrest arm 16 passes, see FIG. 3b, in order to be pivotably the attached to the first axis 14 able to be simply concealed by a cover, not illustrated, or by a specific trim of the structure of the backrest when the seat does not comprise a headrest.

As can be seen in FIGS. 2a and 3a, showing the headrest arm 16 in profile, said L-shaped profile is substantially closed, in other words the first segment 163 and the second segment 164 form an angle less than 90° so that, given the permitted rotation of said arm in use, said arm adapts to the shape of the top of the backrest in the low position of the headrest and does not substantially exceed a rear plane of the backrest in the raised position of the headrest, avoiding interfering with a space behind the seat, generally reserved for the occupant of another seat located behind.

In this embodiment, the upper face 113 of the backrest advantageously also has a backward tilt in profile view.

Other shapes are however possible for the upper face of the backrest and advantageously the shape of the headrest arm in profile view, as in the example illustrated in FIGS. 2a and 3a, will be suitable for following as closely as possible, in the lowered position of the headrest, said upper face of the backrest.

Although only one raised position of the headrest is illustrated in FIGS. 3a, 3b and 3c, the headrest is preferably shaped to be able to be placed in one or more intermediate positions between the low position illustrated in FIGS. 2a, 2b, 2c and highest position authorised by the possible angular movement of the headrest arm 16, limited by its construction.

In an embodiment, the angular position of the support 17 about the second axis 15 is adjustable independently of the angular position of the headrest arm 16 about the first axis 14.

In an embodiment, the angular position of the support 17 about the second axis 15 is coupled to the angular position of the headrest arm 16 about the first axis 14, for example in order to obtain a tilting of the head cushion 13 predefined according to the more or less high position of the headrest.

Such a result is obtained, for example, by using a second arm in order to form, between the backrest and the support 17, a parallelogram or pantograph connection, which solutions are not illustrated. Advantageously, in this case, the cushion is also rotatable in order to adjust the only angular position if necessary.

The invention is presented in the various figures with a single headrest arm 16 centred in an axial plane of the seat and in the shape of a blade. The blade has an average width LB, the width being constant or otherwise, in the transverse direction Y and an average thickness Eb, the thickness being constant or otherwise, the average width Lb being greater than the average thickness Eb. Advantageously, the average width Lb is several times the average thickness Eb, so as to give the arm a reduced footprint without harming the stability of the pivot link. The width in the direction Y of the width of the seat is illustrated as relatively small with respect to the width of the backrest. This illustration is not however limiting.

In practice, the arm can have any width, logically at most a width of the backrest, a larger width although possible being in principle not of interest, provided the strength of said arm is suitable for supporting the forces undergone during use. If it is sufficiently wide, the arm may comprise recesses in order to reduce the mass.

The headrest can also comprise two or more similar arms, in other words having the same shape in profile view and hinged on the same first and second axes, and more or less separated along the width of the backrest with respect to each other, in order to work simultaneously in parallel.

The headrest arm is produced from any material having mechanical characteristics which are compatible with the forces applied during use of the seat.

For example, in particular when a low mass of the device is sought, the headrest arm is advantageously produced from an aluminium alloy or a composite material with a thermosetting or thermoplastic polymer matrix.

The chosen material, and a structure of the headrest arm, are matched according to a rigidity and/or desired elasticities of said headrest arm.

The headrest of the seat of the invention is therefore particularly simple to install on a seat. It does not require that a seat be equipped with a specific padding of the backrest depending on whether said seat is equipped or not with the headrest.

It thus offers the operator who uses the seats a genuine comfort option: with or without headrest, practically without impact on the rest of the definition of the seat which can thus be converted at any time during its delivery or during its use.

The pivot links on which the rigid headrest arm is hinged are also simpler and more reliable than the solutions using arms with several sections hinged to one another, and than those that use sliding links. This results for the headrest of the invention in a more reliable, more lightweight and less maintenance-demanding assembly.

An occupant of the seat can modify the position of his headrest with a single hand, a position which can be stabilised by a continuous braking device having a suitable friction resistance, and or by a releasable braking or locking device.

Figure 4:
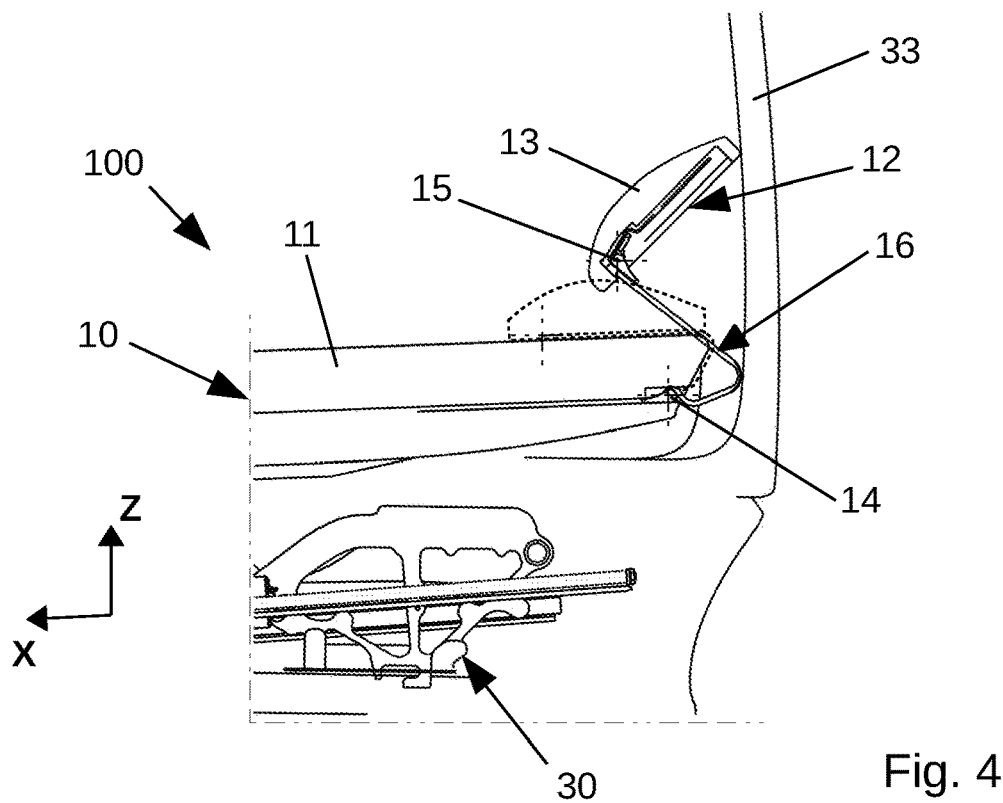
FIG. 4, a partial cross-section of the seat of FIG. 1, with the backrest tilted in order to place the seat in bed configuration, in which the headrest is placed in a raised position without interfering with the trim shell of the seat, and compared with the low position of the headrest represented by dashed lines.

FIG. 4 illustrates another advantage of the seat of the invention when the headrest is used on a seat that is convertible into a bed.

In order to isolate the seat occupant from the space located behind the seat, which is generally occupied by another seat, the seat comprises a trim shell 33 which forms a private space for the seat occupant.

When the seat is converted into a bed, generally accompanied by a forward translation of the seat portion 20 and a backward tilting of the backrest 10, the top of the backrest is located close to the trim shell 33, for obvious space-saving reasons in the layout of passenger cabins.

In the invention, the headrest, when it is placed in the low position on the backrest, does not project above the top part of the backrest, as in the case of certain headrests of the prior art.

A projection above the backrest would result in having to extend the forward movement of the seat in order to avoid interference with the trim shell 33, a movement which is avoided with the headrest of the invention. Advantageously, in the low position, represented by dotted lines in FIG. 4, the headrest forms a pillow when the seat is in the bed position.

In addition, as illustrated in the FIG. 4, the bed position of the seat with the top of the backrest close to the trim shell 33 does not prevent the deployment of the headrest 12. In the position illustrated by solid lines in the figure, the partial return of the head cushion 13, associated with a rotation of said head cushion about the second axis 15 forms a relatively raised support of the head which corresponds to a suitable position for a prone occupant watching a screen located towards the front of his seat.

The invention claimed is:

1. A seat (100), comprising:
a seat portion (20) having a backrest (10), said backrest comprising a padding (11); and
a headrest (12) attached to a structure of said backrest, said headrest comprising a head cushion (13) attached to the backrest (10) by at least one headrest arm (16) having a predefined elasticity,
wherein:
said at least one headrest arm is hingedly attached on the structure of the backrest by a pivot link determining a first axis (14) of rotation, parallel to a transverse direction (Y) of the seat, fixed with respect to the structure of said backrest,
said head cushion is hinged on the at least one headrest arm (16) by a pivot link determining a second axis (15) of rotation, parallel to the transverse direction (Y) of the seat, fixed with respect to the head cushion,
the first axis (14) is situated in a top part of the backrest (10) and substantially at a rear face of a structural part of said backrest,
the second axis (15) is situated close to a lower edge of the head cushion (13), and
the headrest arm (16) is arranged so as to hold the head cushion (13) of said headrest in:
a low position in which the head cushion (13) rests against a front face (111) of the backrest (10), and
at least one raised position in which the head cushion is situated in front of and above the position of the head cushion in the low position,
said head cushion being moved between the low position and the at least one raised position of the headrest by a rotation of the at least one headrest arm (16) about the first axis (15), said at least one arm being shaped to go around the backrest (10), without interfering with the padding (11) of said backrest, in all the positions of said headrest arm between said low position and the at least one raised position of the head cushion.

2. The seat according to claim 1, wherein the pivot link determining the first axis (14) is arranged in an enclosing space of the backrest (10), and wherein a trim of the backrest comprises an opening (141) via which the at least one headrest arm (16) hinged about the first axis (14) exits said enclosing space.

3. The seat according to claim 1, wherein the headrest (12) comprises a single headrest arm (16) having a blade shape, of which an average width (Lb) in the transverse direction (Y) of the seat is several times greater than average thickness (Eb) of said blade.

4. The seat according to claim 1, wherein the at least one headrest arm (16) comprises, at an end hinged on the structure of the backrest, a curved portion situated between the first axis (14) located inside an enveloping shape of the backrest and a part of said at least one headrest arm situated outside said enveloping shape of the backrest when the headrest is in the low position.

5. The seat according to claim 1, convertible into a bed by a backward tilting of the backrest (10), wherein the headrest (12) has a position for holding the head of a seat occupant raised in the bed position, position in which the at least one headrest arm (16) is pivoted backwards, when the backrest is in a position tilted backwards about the first axis (14) and wherein the head cushion (13) is pivoted forwards about the second axis (15).

6. The seat according to claim 1, wherein, in the low position of the headrest (12), the position of the head cushion (13) with respect to the backrest (11) is defined to correspond to an ergonomic supporting of the head in the seated position of an occupant belonging to a small-sized population at the 5th percentile of a predefined sample of a target adult population, and wherein, in a raised position of the headrest, said head cushion is moved upwards and forwards with respect to the low position, into a position of said head cushion with respect to the backrest defined so as to correspond with an ergonomic supporting of the head in the seated position of an occupant belonging to a large-sized population at the 95th percentile of said sample of the target adult population.

7. The seat according to claim 1, wherein a blade or blades of the headrest arm or arms (16) are produced having predefined elasticities.

8. The seat according to claim 1, wherein a brake and/or a lock is arranged on the first axis (14) in order to hold a selected angular position of the at least one headrest arm (16) with respect to the backrest (10).

9. The seat according to claim 8, wherein a brake and/or a lock is arranged on the second axis (15) in order to hold a selected angular position of the head cushion (13) with respect to the at least one headrest axis (16).

10. The seat according to claim 1, wherein the head cushion (13) is attached to the structure of the backrest (10) by a plurality of headrest arms (16), all the headrest arms of said plurality of headrest arms being hinged on said structure of the backrest about a same first axis (14), and said head cushion being hinged on each of the headrest arms of said plurality of headrest arms about a same second axis (15).

11. The seat according to claim 10, wherein at least two headrest arms (16) of the plurality of headrest arms has a blade shape for which an average width (Lb) in the transverse direction (Y) of the seat is several times greater than average thickness (Eb) of said blade.

12. The seat according to claim 1, wherein the at least one headrest arm (16) has, in profile view, an L shape determining a first segment (163), a free end (161) of which is hinged on the structure of the backrest about the first axis (14), determining a second segment (164), at a free end (162) of which the head cushion (13) is hinged about the second axis (15), and wherein when the headrest is in the low position, said second segment is substantially against the front face (111) of the backrest and said first segment is above the backrest (10).

13. The seat according to claim 12, wherein a brake and/or a lock is arranged on the first axis (14) in order to hold a selected angular position of the at least one headrest arm (16) with respect to the backrest (10).

14. The seat according to claim 12, wherein the pivot link determining the first axis (14) is arranged in an enclosing space of the backrest (10), and wherein a trim of the backrest comprises an opening (141) via which the at least one headrest arm (16) hinged about the first axis (14) exits said enclosing space.

15. The seat according to claim 12 wherein, when the headrest is in the low position, the first segment (163) is substantially against an upper face (113) of the backrest (10).

16. The seat according to claim 15, wherein a support (17) of the head cushion (13), situated on a rear face of said head cushion, comprises at least one recess (171), on a rear face of said support placed facing the front face (111) of the backrest, in which the second segment (164) of the at least one headrest arm (16) is housed when the headrest is in the low position.

17. The seat according to claim 15, wherein a brake and/or a lock is arranged on the first axis (14) in order to hold a selected angular position of the at least one headrest arm (16) with respect to the backrest (10).

18. The seat according to claim 12, wherein a support (17) of the head cushion (13), situated on a rear face of said head cushion, comprises at least one recess (171), on a rear face of said support placed facing the front face (111) of the backrest, in which the second segment (164) of the at least one headrest arm (16) is housed when the headrest is in the low position.

19. The seat according to claim 18, wherein a brake and/or a lock is arranged on the first axis (14) in order to hold a selected angular position of the at least one headrest arm (16) with respect to the backrest (10).

* * * * *